US012763232B2

(12) United States Patent
Mizuno et al.

(10) Patent No.: US 12,763,232 B2
(45) Date of Patent: Oct. 13, 2026

(54) WIRING MEMBER AND METHOD OF MANUFACTURING WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Housei Mizuno, Osaka (JP); Kyousyou Kou, Osaka (JP); Miyu Aramaki, Osaka (JP); Junichi Shirakawa, Mie (JP); Ryo Aragaki, Mie (JP); Tatsunori Tsutsumi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 167 days.

(21) Appl. No.: 18/725,382

(22) PCT Filed: Jan. 6, 2023

(86) PCT No.: PCT/JP2023/000187

§ 371 (c)(1),
(2) Date: Jun. 28, 2024

(87) PCT Pub. No.: WO2023/136216

PCT Pub. Date: Jul. 20, 2023

(65) Prior Publication Data

US 2025/0069776 A1 Feb. 27, 2025

(30) Foreign Application Priority Data

Jan. 13, 2022 (JP) ................................ 2022-003491

(51) Int. Cl.
*H01B 7/08* (2006.01)
*H02G 3/04* (2006.01)
*H02G 3/30* (2006.01)

(52) U.S. Cl.
CPC ................................ *H01B 7/0823* (2013.01)

(58) Field of Classification Search
CPC ...... H01B 7/0823; H01B 7/0846; H02G 3/04; H02G 3/30
See application file for complete search history.

(56) References Cited

U.S. PATENT DOCUMENTS 3,733,428 A * 5/1973 Fry ...................... H01B 7/0846 156/290
5,327,513 A * 7/1994 Nguyen ............... G02B 6/4403 174/117 A (Continued)

FOREIGN PATENT DOCUMENTS

JP 5-46608 U 6/1993
JP 2021-72215 5/2021

(Continued)

OTHER PUBLICATIONS

Japan Office Action issued in Japan Patent Application No. 2022-003491, dated Aug. 5, 2025, together with English translation thereof.

(Continued)

*Primary Examiner* — Timothy J Thompson
*Assistant Examiner* — Amol H Patel
(74) *Attorney, Agent, or Firm* — Greenblum & Bernstein, P.L.C.

(57) ABSTRACT

A wiring member includes: a base member; a first wire-like transmission member group including a plurality of first wire-like transmission members; and a second wire-like transmission member group including a plurality of second (Continued)

wire-like transmission members. The first wire-like transmission member group includes a first parallel section, the second wire-like transmission member group includes a second parallel section in a position adjacent to the first parallel section, and an interval between the first parallel section and the second parallel section is larger than an interval between the first wire-like transmission members in the first parallel section and an interval between the second wire-like transmission members in the second parallel section.

14 Claims, 5 Drawing Sheets

(56) References Cited

U.S. PATENT DOCUMENTS

| | | | | |
|---|---|---|---|---|
| 5,502,287 A * | 3/1996 | Nguyen | H01B 7/0846 174/117 A |
| 2014/0182890 A1* | 7/2014 | Gross | H01B 7/00 174/251 |
| 2019/0392963 A1* | 12/2019 | Ishida | H01B 7/0045 |
| 2020/0168359 A1* | 5/2020 | Kohori | H01B 7/0869 |
| 2023/0028477 A1 | 1/2023 | Fukushima et al. | |
| 2023/0052711 A1 | 2/2023 | Aramaki et al. | |
| 2023/0122992 A1* | 4/2023 | Kou | H01B 7/0846 174/72 A |
| 2023/0162885 A1 | 5/2023 | Kou et al. | |

FOREIGN PATENT DOCUMENTS

| | | | |
|---|---|---|---|
| WO | 2019/225091 | 11/2019 | |
| WO | 2021/084883 | 5/2021 | |
| WO | 2021/100464 | 5/2021 | |
| WO | 2021/192943 | 9/2021 | |
| WO | WO-2021192943 A1 * | 9/2021 | H01B 7/0846 |
| WO | 2021/210325 | 10/2021 | |

OTHER PUBLICATIONS

Japan Office Action issued in Japan Patent Application No. 2022-003491, dated Feb. 12, 2025.

International Search Report issued in International Patent Application No. PCT/JP2023/000187, dated Mar. 20, 2023, along with an English translation thereof.

International Preliminary Report on Patentability issued in International Patent Application No. PCT/JP2023/000187, dated Jul. 18, 2024, along with an English translation thereof.

* cited by examiner

WIRING MEMBER AND METHOD OF MANUFACTURING WIRING MEMBER

TECHNICAL FIELD

The present disclosure relates to a wiring member and a method of manufacturing the wiring member.

BACKGROUND ART

Patent Document 1 discloses a wiring member in which three or more conductive paths are provided side by side to be flatly formed, and intervals between the conductive paths are different from each other. In Patent Document 1, the conductive paths are easily positioned with a high accuracy in the flat wiring member in which the conductive paths are provided side by side. The intervals between the conductive paths can be simply varied using this high positioning accuracy, thus measures against noise can be simply performed in the flat wiring member.

PRIOR ART DOCUMENTS

Patent Document(s)

Patent Document 1: Japanese Patent Application Laid-Open No. 2021-072215

SUMMARY

Problem to be Solved by the Invention

It is desired that a plurality of wire-like transmission members can be easily fused to a base member even when different types of wire-like transmission member or a large number of wire-like transmission members are applied.

Accordingly, an object of the present disclosure is to provide a technique capable of easily fusing a plurality of wire-like transmission members to a base member.

Means to Solve the Problem

A wiring member according to the present disclosure is a wiring member including: a base member including a support surface; a first wire-like transmission member group including a plurality of first wire-like transmission members; and a second wire-like transmission member group including a plurality of second wire-like transmission members, wherein the first wire-like transmission member group includes a first parallel section in which the plurality of first wire-like transmission members are fused in a parallel state to the support surface, the second wire-like transmission member group includes a second parallel section in which the plurality of second wire-like transmission members are fused in a parallel state to the support surface in a position adjacent to the first parallel section, and an interval between the first parallel section and the second parallel section is larger than an interval between the first wire-like transmission members in the first parallel section and an interval between the second wire-like transmission members in the second parallel section.

Effects of the Invention

According to the present disclosure, the plurality of wire-like transmission members can be fused to the base member easily.

DESCRIPTION OF EMBODIMENT(S)

Description of Embodiments of Present Disclosure

Figure 1:
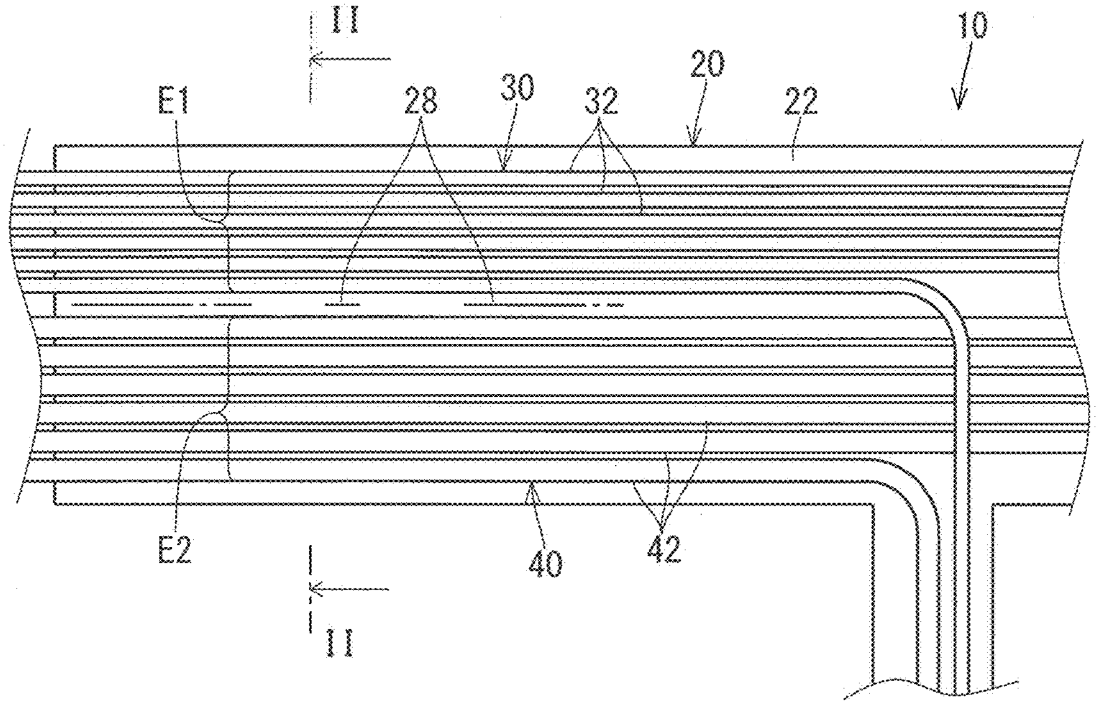
FIG. 1 is a plan view illustrating a wiring member according to an embodiment 1.

Embodiments of the present disclosure are listed and described firstly.

A wiring member according to the present disclosure is as follows.

(1) A wiring member includes: a base member including a support surface; a first wire-like transmission member group including a plurality of first wire-like transmission members; and a second wire-like transmission member group including a plurality of second wire-like transmission members, wherein the first wire-like transmission member group includes a first parallel section in which the plurality of first wire-like transmission members are fused in a parallel state to the support surface, the second wire-like transmission member group includes a second parallel section in which the plurality of second wire-like transmission members are fused in a parallel state to the support surface in a position adjacent to the first parallel section, and an interval between the first parallel section and the second parallel section is larger than an interval between the first wire-like transmission members in the first parallel section and an interval between the second wire-like transmission members in the second parallel section.

According to the present disclosure, the interval between the first parallel section and the second parallel section is larger than the interval between the first wire-like transmission members in the first parallel section and the interval between the second wire-like transmission members in the second parallel section. Thus, an appropriate fusion operation can be performed on each wire-like transmission member group using a relatively large interval between the first parallel section and the second parallel section, and the plurality of wire-like transmission members can be easily fused to the base member.

(2) In the wiring member according to (1), a thickness of each of the first wire-like transmission members and a thickness of each of the second wire-like transmission members may be different from each other. When the thickness of the first wire-like transmission member and the thickness of the second wire-like transmission member are different from each other, fusion conditions are assumed to be different from each other. In such a case, the wire-like transmission members are easily fused under different conditions using a relatively large interval between the first parallel section and the second parallel section.

(3) In the wiring member according to (1) or (2), a material of an outermost surrounding surface of each of the first wire-like transmission members and a material of an outermost surrounding surface of each of the second wire-like transmission members may be different from each other.

When the material of the outermost surrounding surface of the first wire-like transmission member and the material of the outermost surrounding surface of the second wire-like transmission member are different from each other, fusion conditions are assumed to be different from each other. In such a case, the wire-like transmission members are easily fused under different conditions using a relatively large interval between the first parallel section and the second parallel section.

(4) In the wiring member according to (1), each of the first wire-like transmission members and each of the second wire-like transmission members may be a same as each other regarding a material of an outermost surrounding surface and a thickness. Considered also in this case is that when a total number of the first wire-like transmission members and the second wire-like transmission members is large, it is hard to collectively fuse all of the wire-like transmission members. In such a case, an appropriate fusion operation can be performed on each wire-like transmission member group using a relatively large interval between the first parallel section and the second parallel section.

(5) In the wiring member according to (4), a width of the first wire-like transmission member group and a width of the second wire-like transmission member group may be a same as each other. Accordingly, fusion of the first wire-like transmission member group and fusion of the second wire-like transmission member group can be easily performed by similar operations.

(6) In the wiring member according to (4) or (5), the interval between the plurality of first wire-like transmission members in the first wire-like transmission member group and the interval between the plurality of second wire-like transmission members in the second wire-like transmission member group may be a same as each other. Accordingly, fusion of the first wire-like transmission member group and fusion of the second wire-like transmission member group can be performed by similar operations.

(7) In the wiring member according to (1) to (6), a contact mark of a fusion tool may be formed between the first wire-like transmission member group and the second wire-like transmission member group in the base member. In this case, an area between the first wire-like transmission member group and the second wire-like transmission member group can be used as a space for an end of the fusion tool to escape.

(8) It is applicable that the wiring member according to any one of (1) to (7) further includes a third wire-like transmission member group including a plurality of third wire-like transmission members, wherein the third wire-like transmission member group includes a third parallel section in which the plurality of third wire-like transmission members are fused in a parallel state to the support surface in a position adjacent to the second parallel section on a side opposite to the first parallel section, and an interval between the second parallel section and the third parallel section is larger than an interval between the second wire-like transmission members in the second parallel section and an interval between the third wire-like transmission members in the third parallel section.

According to the present disclosure, the interval between the second parallel section and the third parallel section is larger than the interval between the second wire-like transmission members in the second parallel section and the interval between the third wire-like transmission members in the third parallel section. Thus, an appropriate fusion operation can be performed on each wire-like transmission member group using a relatively large interval between the second parallel section and the third parallel section, and the plurality of wire-like transmission members can be easily fused to the base member.

A method of manufacturing a wiring member according to the present disclosure is as follows.

(9) A method of manufacturing a wiring member for fusing a plurality of first wire-like transmission members in a first wire-like transmission member group and a plurality of second wire-like transmission members in a second wire-like transmission member group to a support surface of a base member includes: fusing the plurality of first wire-like transmission members in a parallel state to the support surface in a first parallel section, fusing the plurality of second wire-like transmission members in a parallel state to the support surface in a second parallel section adjacent to the first parallel section, and making an interval between the first parallel section and the second parallel section larger than an interval between the first wire-like transmission members in the first parallel section and an interval between the second wire-like transmission members in the second parallel section.

According to the present disclosure, the interval between the first parallel section and the second parallel section is larger than the interval between the first wire-like transmission members in the first parallel section and the interval between the second wire-like transmission members in the second parallel section. Thus, an appropriate fusion operation can be performed on each wire-like transmission member group using a relatively large interval between the first parallel section and the second parallel section, and the plurality of wire-like transmission members can be easily fused to the base member.

(10) In the method of manufacturing the wiring member according to (9), a process of fusing the plurality of second wire-like transmission members in a parallel state to the support surface may be performed in the second parallel section separately from a process of fusing the plurality of first wire-like transmission members in a parallel state to the support surface in the first parallel section. Accordingly, each process can be performed while preventing influence on each other.

DETAILED DESCRIPTION OF EMBODIMENT OF PRESENT DISCLOSURE

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

EMBODIMENT

Figure 2:
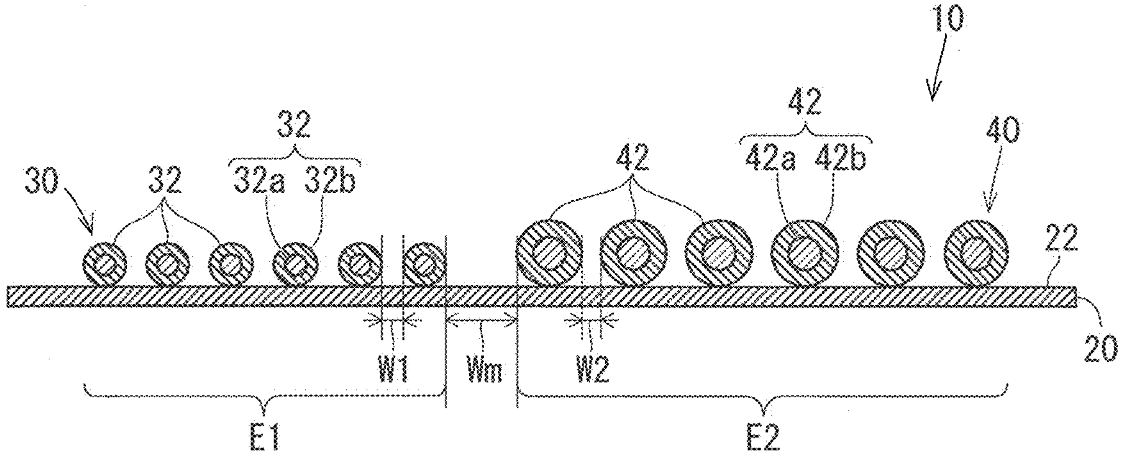
FIG. 2 is a cross sectional view along a II-II line in FIG. 1.

A wiring member according to an embodiment is described hereinafter. FIG. 1 is a plan view illustrating a wiring member 10. FIG. 2 is a cross-sectional view along a II-II line in FIG. 1.

The wiring member 10 includes a base member 20, a first wire-like transmission member group 30, and a second wire-like transmission member group 40.

The base member 20 is a member including a support surface 22. The support surface 22 may be a planar surface, a curved surface, or a surface in which a planar surface and a curved surface are combined.

The base member 20 may be a sheet-like member flexibly bended such as a resin sheet or a non-woven sheet, or may also be a member keeping a constant shape such as a resin molded component. When the base member 20 is a sheet-like member which is bended, the base member 20 to which the wire-like transmission member groups 30 and 40 are fused can be disposed to be bended as a flat wiring member along an arrangement target position in a vehicle. The base member 20 may be made up of a resin sheet with an inner portion evenly filled and a non-woven sheet stacked to each other. Herein, the base member 20 is assumed to be a bendable sheet made of resin. The resin constituting the base member 20 may be the same as or different from that of coverings 32*b* and 42*b*.

The first wire-like transmission member group 30 includes a plurality of first wire-like transmission members 32. The second wire-like transmission member group 40 includes a plurality of second wire-like transmission members 42.

The first wire-like transmission member 32 and the second wire-like transmission member 42 are assumed to be wire-like transmission members connecting components in a vehicle. The first wire-like transmission member 32 and the second wire-like transmission member 42 extend along wiring routes corresponding to positions of components as connection destinations of the wire-like transmission members 32 and 42.

More specifically, the first wire-like transmission member 32 and the second wire-like transmission member 42 may be wire-like members transmitting electricity or light, for example. For example, the first wire-like transmission member 32 may be a general electrical wire including a core wire 32*a* and the covering 32*b* around the core wire 32*a*. The core wire 32*a* is formed of copper, copper alloy, aluminum, or aluminum alloy, for example. The covering 32*b* is formed of polyvinyl chloride (PVC) or polyethylene (PE), for example. In the similar manner, the second wire-like transmission member 42 may be a general covering electrical wire including a core wire 42*a* and the covering 42*b* around the core wire 42*a*. The first wire-like transmission member 32 and the second wire-like transmission member 42 may be a shielded wire, a twisted wire, or an optical fiber, for example.

The first wire-like transmission member 32 and the second wire-like transmission member 42 transmitting the electricity may be various kinds of signal lines or various kinds of power lines. Some of the wire-like transmission members transmitting the electricity may be used as an antenna or coil, for example, transmitting or receiving a signal or electrical power to or from a space.

Each of the first wire-like transmission member 32 and the second wire-like transmission member 42 may be a single wire-like object or a composite object of a plurality of wire-like objects (a twisted wire and a cable made up of a plurality of wire-like objects covered by a sheath).

Description in the present embodiment is based on an assumption that the first wire-like transmission member 32 and the second wire-like transmission member 42 are covering electrical wires.

The plurality of first wire-like transmission members 32 and the plurality of second wire-like transmission members 42 are fixed to the support surface of the base member 20. Fusion is achieved when at least one of a surface of the coverings 32*b* and 42*b* of the first wire-like transmission member 32 or the second wire-like transmission member 42 and/or the support surface 22 of the base member 20 is melted and then hardened, the surface of the coverings 32*b* and 42*b* and the support surface 22 of the base member 20 are fixed to each other. The fusion is also referred to as welding in some cases. The fusion can be performed by ultrasonic welding, heating pressurizing welding, hot air welding, or high-frequency welding, for example. A fusion part may be a continuous straight line in an extension direction of the first wire-like transmission member 32 or the second wire-like transmission member 42. A fusion part may be a set of a plurality of spot fusion parts formed at intervals in an extension direction of the first wire-like transmission member 32 or the second wire-like transmission member 42.

Routes of the first wire-like transmission member 32 and the second wire-like transmission member 42 on the support surface 22 can be optionally set in accordance with circumstances of a position of a component to which the wire-like transmission members 32 and 42 are connected and a space into which the present wiring member 10 is incorporated, for example. The first wire-like transmission member 32 and the second wire-like transmission member 42 may extend along straight routes or bended routes on the support surface 22, or a part of the first wire-like transmission member 32 and the second wire-like transmission member 42 may intersect with the other part thereof. FIG. 1 illustrates an example that the plurality of first wire-like transmission members 32 and the plurality of second wire-like transmission members 42 extend along straight routes, an example that the plurality of first wire-like transmission members 32 and the plurality of second wire-like transmission members 42 are bended in a midway part, and an example that the first wire-like transmission member 32 intersects with the second wire-like transmission member 42.

The base member 20 is formed into a shape along the routes of the first wire-like transmission member 32 and the second wire-like transmission member 42. Described in the present embodiment is an example that one rectangular-shaped part extends from one side edge of the other rectangular-shaped part in the base member 20.

End portions of the plurality of first wire-like transmission members 32 and end portions of the plurality of second wire-like transmission members 42 are considered to extend from the base member 20 per unit corresponding to components as the connection destinations and to be connected to connectors. The end portions of the plurality of first wire-like transmission members 32 and the end portions of the plurality of second wire-like transmission members 42 are connected to the components as the connection destinations via the connectors. The connectors are also considered to be fixed to the base member 20.

The description focuses on parallel sections of the first wire-like transmission member group 30 and the second wire-like transmission member group 40.

The first wire-like transmission member group 30 includes a first parallel section E1 in which the plurality of first wire-like transmission members 32 are fused in a parallel state to the support surface 22. The second wire-like transmission member group 40 includes a second parallel section E2 in which the plurality of second wire-like transmission members 42 are fused in a parallel state to the support surface 22 in a position adjacent to the first parallel section E1. Thus, focusing on the first parallel section E1 and the second parallel section E2, the plurality of first wire-like transmission members 32 and the plurality of second wire-like transmission members 42 are parallelly arranged.

When the first wire-like transmission member group 30 includes two first wire-like transmission members 32, one gap is located between the plurality of first wire-like transmission members 32 in the first parallel section E1. When the first wire-like transmission member group 30 includes three or more first wire-like transmission members 32, two or more gaps are located between the plurality of first wire-like transmission members 32 in the first parallel section E1. When two or more gaps are located in the first parallel section, the plurality of gaps may have equal widths or different widths. In the present embodiment, two or more gaps between the plurality of first wire-like transmission members 32 are located in the first parallel section E1, and two or more gaps are equal intervals W1. The state where two or more gaps are the equal intervals includes a range caused by a manufacturing error.

When the second wire-like transmission member group 40 includes two second wire-like transmission members 42, one gap is located between the plurality of second wire-like transmission members 42 in the second parallel section E2. When the second wire-like transmission member group 40 includes three or more second wire-like transmission members 42, two or more gaps are located between the plurality of second wire-like transmission members 42 in the second parallel section E2. When two or more gaps are located in the second parallel section, the plurality of gaps may have equal widths or different widths. In the present embodiment, two or more gaps between the plurality of second wire-like transmission members 42 are located in the second parallel section E2, and two or more gaps are equal intervals W2. The state where two or more gaps are the equal intervals includes a range caused by a manufacturing error.

The first wire-like transmission members 32 adjacent to each other may have contact with each other in the first parallel section E1. The second wire-like transmission members 42 adjacent to each other may have contact with each other in the second parallel section E2. In this case, the interval W1 or the interval W2 can be considered 0 mm.

The wiring member 10 may include the other wire-like transmission member which is not parallel to any of the first wire-like transmission member 32 in the first parallel section E1 and the second wire-like transmission member 42 in the second parallel section E2.

An interval Wm between the first parallel section E1 and the second parallel section E2 is larger than the interval W1 between the first wire-like transmission members 32 in the first parallel section E1 and the interval W2 between the second wire-like transmission members 42 in the second parallel section E2.

When the intervals W1 between the first wire-like transmission members 32 in the first parallel section E1 are not the same as each other, the interval W1 may be an average value. In the similar manner, when the intervals W2 between the second wire-like transmission members 42 in the second parallel section E2 are not the same as each other, the interval W2 may be an average value.

The interval W1 and the interval W2 may be the same as or different from each other. The interval Wm between the sections E1 and E2 is twice or more an average value of the interval W1 and the interval W1, for example. For example, it is applicable that the intervals W1 and W2 described above are 0.5 mm, and the interval Wm between the sections E1 and E2 is equal to or larger than 1 mm and equal to or smaller than 2 mm.

A thickness of the first wire-like transmission member 32 described above and a thickness of the second wire-like transmission member 42 described above are different from each other. In the present embodiment, the first wire-like transmission member 32 is thinner than the second wire-like transmission member 42. Materials of the coverings 32*b* and 42*b* may be the same as or different from each other.

A contact mark 28 of a fusion tool may be formed between the first parallel section E1 of the first wire-like transmission member group 30 and the second parallel section E2 of the second wire-like transmission member group 40 in the base member 20. As described hereinafter, the fusion tool is a tool for fusing the first wire-like transmission member 32 or the second wire-like transmission member 42 to the support surface 22. The tool may be a jig for positioning the base member 20 or the wire-like transmission members 32 and 42 at a constant position, or may also be a tool for applying energy for fusion. The contact mark 28 may be formed in the support surface 22, or may also be formed in a surface of the base member 20 on a side opposite to the support surface 22. The contact mark 28 may be a mark made by energy, applied in fusion, melting a part of the base member 20 or a press mark or a friction mark formed by a rigid jig pressing the base member 20.

Figure 3:
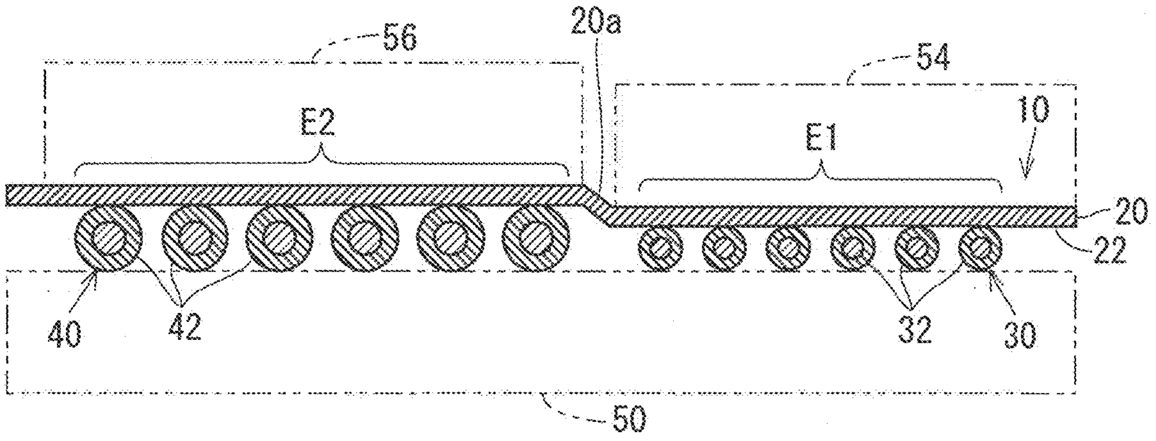
FIG. 3 is an explanation view illustrating an example of a fusion operation.

FIG. 3 is an explanation view illustrating an operation example of fusing the wire-like transmission members 32 and 42 to the base member 20. The fusion is performed by applying heat or ultrasonic vibration as energy for fusion between a lower support tool 50 and upper pressing tools 54 and 56 while the wire-like transmission members 32 and 42 and the base member 20 are sandwiched between the lower support tool 50 and the upper pressing tools 54 and 56, for example. In the example illustrated in FIG. 3, the wire-like transmission members 32 and 42 are disposed on the lower support tool 50, and the base member 20 is disposed thereon.

The plurality of first wire-like transmission members 32 are fused in a parallel state to the support surface 22 between the lower support tool 50 and the upper pressing tool 54 in the first parallel section E1. In the second parallel section E2 adjacent to the first parallel section E1, the plurality of second wire-like transmission members 42 are fused in a parallel state to the support surface 22 between the lower support tool 50 and the upper pressing tool 54. In the fusion, the interval Wm between the first parallel section E1 and the second parallel section E2 is set larger than the intervals W1 and W2 described above.

The first wire-like transmission member 32 and the second wire-like transmission member 42 are different from each other in thickness. Thus, a position of the upper pressing tool 54 pressing the base member 20 on the first wire-like transmission member 32 in an up-down direction and a position of the upper pressing tool 56 pressing the base member 20 on the second wire-like transmission member 42 in the up-down direction are different from each other. An inclination part 20*a* in which the base member 20 is inclined so that a height thereof is changed is provided between the first parallel section E1 and the second parallel section E2 in the fusion, thus such a configuration can easily deal with a variation of the pressing position in the up-down direction. The interval Wm is provided between the first parallel section E1 and the second parallel section E2, thus the inclination part 20*a* described above can be easily provided in the fusion.

It is assumed that when the thickness of the first wire-like transmission member 32 is different from that of the second wire-like transmission member 42, condition appropriate for the fusion are different from each other. For example, the thick second wire-like transmission member 42 is assumed to be fused by applying larger energy than the thin first wire-like transmission member 32. Thus, the upper pressing tool 54 pressing the base member 20 on the first wire-like transmission member 32 and the upper pressing tool 56 pressing the base member 20 on the second wire-like transmission member 42 are assumed to be separately provided. When the upper pressing tools 54 and 56 are separately provided, fusion can be easily performed under different fusion conditions by changing application energy per unit time or a fusion time.

For example, in a case where the gap between the first wire-like transmission member 32 and the second wire-like transmission member 42 is extremely small, when the positions of the upper pressing tools 54 and 56 are deviated with respect to the wire-like transmission members 32 and 42, the fusion of the upper pressing tool 54 is overlapped with the second wire-like transmission member 42 or the upper pressing tool 56 is overlapped with the first wire-like transmission member 32. Assumed accordingly is a case where fusion conditions appropriate for each of the wire-like transmission members 32 and 42 is not achieved.

The interval Wm is provided between the first parallel section E1 and the second parallel section E2, thus the interval Wm can be used as a space for the upper pressing tools 54 and 56 to escape. Accordingly, the fusion operation can be performed while suppressed is contact between the upper pressing tools 54 and 56 or influence of application energy on each other.

The lower support tool 50 and the upper pressing tools 54 and 56 described above are examples of the fusion tool. The contact mark 28 is the contact mark 28 of the lower support tool 50 and the upper pressing tools 54 and 56, and is assumed to be a mark by edges of the upper pressing tools 54 and 56 on a side of the interval Wm having contact with the base member 20, for example.

The process of fusing the first wire-like transmission member 32 in a parallel state to the support surface 22 in the first parallel section E1 and the process of fusing the second wire-like transmission member 42 in a parallel state to the support surface 22 in the second parallel section E2 are performed separately from each other. Herein, the state of being performed separately indicates that the processes are separately performed so that the fusion conditions can be changed, and includes a case where the processes can be performed under fusion conditions different from each other using the different upper pressing tools 54 and 56 as described above.

Figure 4:
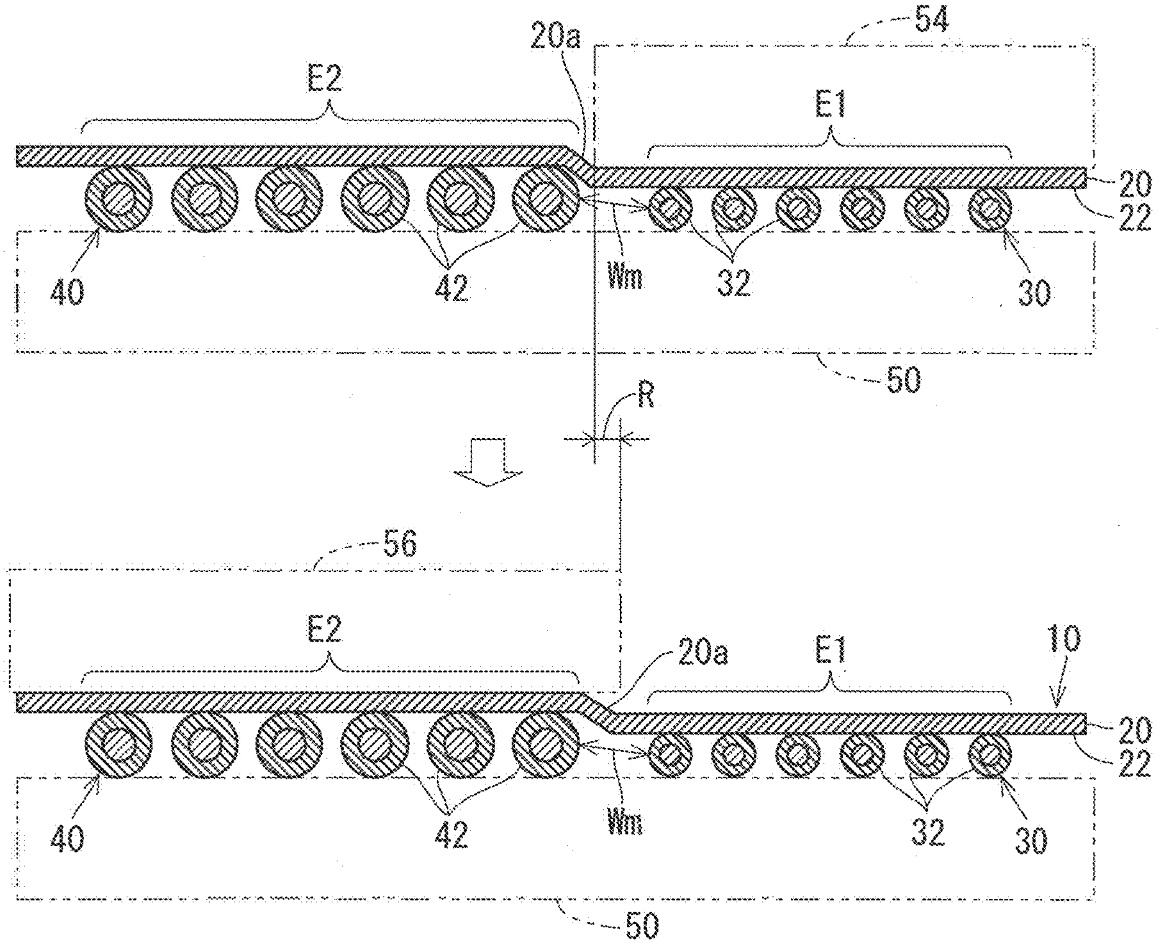
FIG. 4 is an explanation view illustrating another example of a fusion operation.

Needless to say, as illustrated in FIG. 4, the process of fusing the first wire-like transmission member 32 in a parallel state to the support surface 22 in the first parallel section E1 and the process of fusing the second wire-like transmission member 42 in a parallel state to the support surface 22 in the second parallel section E2 may be performed separately from each other with time. In this case, the upper pressing tools 54 and 56 may be different members, or the same member may be moved and used. The processes in each of the parallel sections E1 and E2 are performed separately with time, thus the upper pressing tools 54 and 56 can be located to be overlapped with each other (refer to overlap amount R) in the interval Wm. Accordingly, the upper pressing tools 54 and 56 can be disposed to extend on the first wire-like transmission member 32 or the second wire-like transmission member 42 more reliably using the interval Wm.

Figure 5:
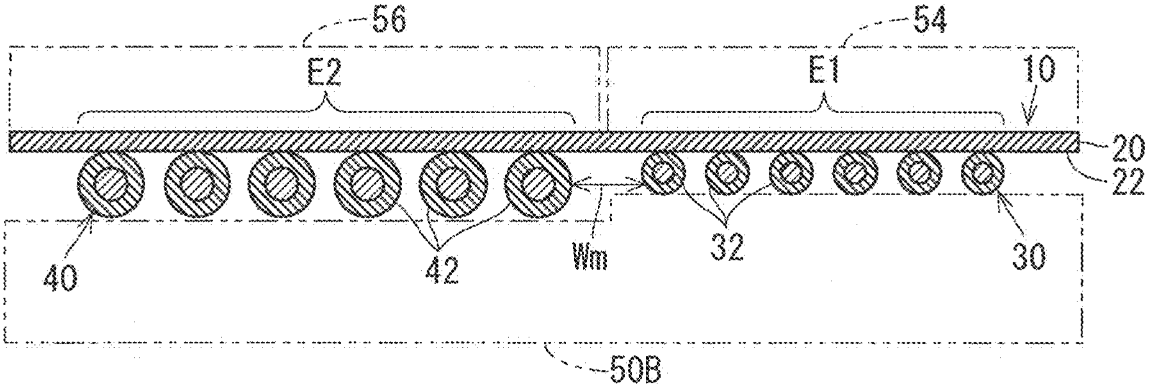
FIG. 5 is an explanation view illustrating still another example of a fusion operation.

As illustrated in FIG. 5, a level difference corresponding to a difference of a diameter between the wire-like transmission members 32 and 42 may be provided between a part of a lower support tool 50B supporting the first parallel section E1 and a part thereof supporting the second parallel section E2. In this case, the base member 20 can be flatly disposed without changing a height regardless of the difference of the thickness of the wire-like transmission members 32 and 42.

Even in this case, the fusion can be performed under the fusion condition appropriate for each of the first wire-like transmission member 32 and the second wire-like transmission member 42 using the upper pressing tools 54 and 56. The interval Wm described above is useful in suppressing influence between the upper pressing tools 54 and 56.

According to the wiring member 10 having such a configuration or the method of manufacturing the wiring member 10, the interval Wm between the first parallel section E1 and the second parallel section E2 is larger than the interval W1 between the first wire-like transmission members 32 and the intervals W2 between the second wire-like transmission members 42. Thus, the appropriate fusion operation can be performed on each of the wire-like transmission member groups 30 and 40 using the relatively large interval Wm between the first parallel section E1 and the second parallel section E2, and the plurality of wire-like transmission members 32 and 42 can be easily fused to the base member 20.

When the thickness of the first wire-like transmission member 32 and the thickness of the second wire-like transmission member 42 are different from each other, fusion conditions are assumed to be different from each other. For example, it is assumed that the fusion positions are different on upper and lower side, or application energy for fusion is different. In such a case, the wire-like transmission members are easily fused under different conditions using the relatively large interval Wm between the first parallel section E1 and the second parallel section E2.

When the contact mark 28 is formed between the first wire-like transmission member group 30 and the second wire-like transmission member group 40 in the base member 20, the area therebetween in the base member 20 can be used as a position for a fusion tool such as the ends of the upper pressing tools 54 and 56 to escape, for example.

Particularly, the process of fusing the first wire-like transmission member 32 to the support surface 22 and the process of fusing the second wire-like transmission member 42 to the support surface 22 are performed separately, thus the processes can be performed while preventing influence on each other.

Various modification examples are described based on a premise of the embodiment described above.

Figure 6:
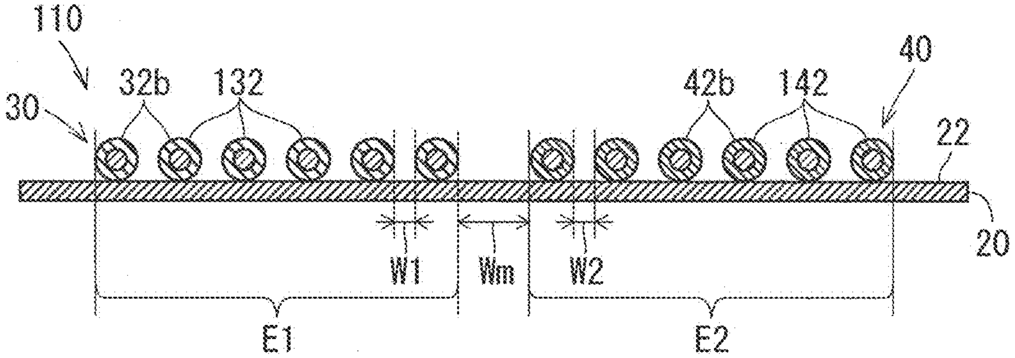
FIG. 6 is a cross-sectional view illustrating a wiring member according to a first modification example.

Assumed is a case where a material of an outermost surface of a first wire-like transmission member 132 corresponding to the first wire-like transmission member 32 and a material of an outermost surface of a second wire-like transmission member 142 corresponding to the second wire-like transmission member 42 are different from each other as with a wiring member 110 according to a first modification example illustrated in FIG. 6. The material of the outermost surface of the first wire-like transmission member 132 is a material of the covering 32*b*, for example, and the material of the outermost surface of the second wire-like transmission member 142 is a material of the covering 42*b*, for example. The covering 32*b* is formed of polyvinyl chloride (PVC), and the covering 42*b* is made of polyethylene (PE), for example.

The interval W1 between the first wire-like transmission members 132 in the first parallel section E1, the interval W2 between the second wire-like transmission members 142 in the second parallel section E2, and the interval Wm between the sections E1 and E2 may be set in the manner similar to the embodiment described above. In the present modification example, a thickness of the first wire-like transmission member 132 and a thickness of the second wire-like transmission member 142 may be the same as each other.

Figure 7:
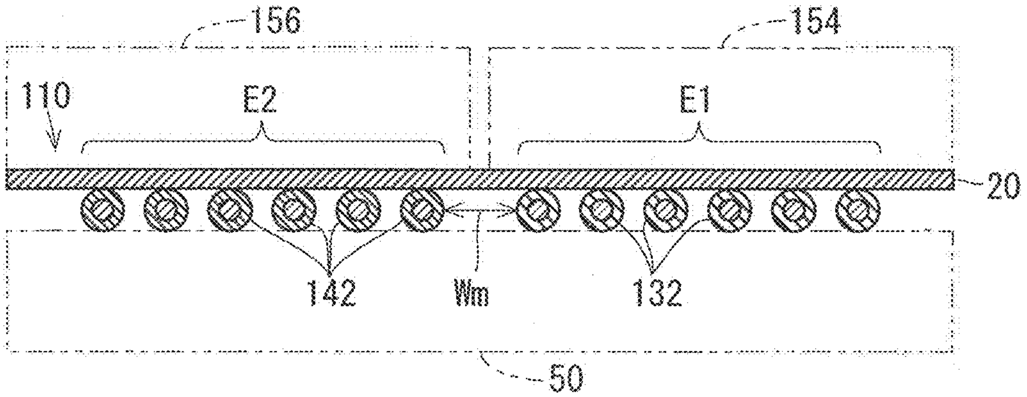
FIG. 7 is an explanation view illustrating an example of a fusion operation.

As illustrated in FIG. 7, the first wire-like transmission member 132, the second wire-like transmission member 142, and the base member 20 are disposed between the lower support tool 50 and the upper pressing tools 154 and 156. The base member 20 is pressed by the upper pressing tool 154 on an upper side of the first wire-like transmission member 132, and the base member 20 is pressed by the upper pressing tool 156 on an upper side of the second wire-like transmission member 142, thus the first wire-like transmission member 132 and the second wire-like transmission member 142 can be fused to the base member 20 under different conditions in the manner similar to the embodiment described above. Accordingly, the first wire-like transmission member 132 and the second wire-like transmission member 142 can be appropriately fused to the base member 20 under a condition set in accordance with the materials of the coverings 32*b* and 42*b*. At this time, the interval Wm is provided, thus the fusion can be performed while mutual influence between the upper pressing tools 154 and 156 is suppressed and mutual influence between the fusion condition for the first wire-like transmission member 132 and the fusion condition for the second wire-like transmission member 142 is suppressed.

Figure 8:
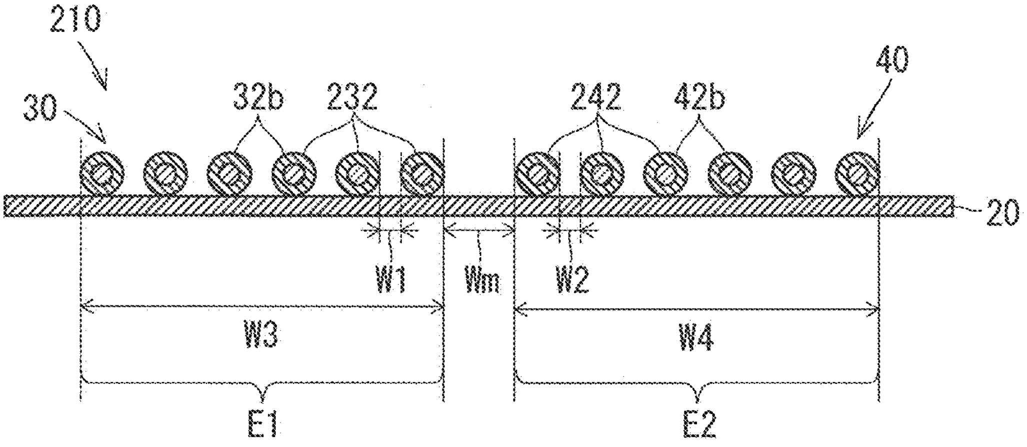
FIG. 8 is a cross-sectional view illustrating a wiring member according to a second modification example.

A first wire-like transmission member 232 corresponding to the first wire-like transmission member 32 and a second wire-like transmission member 242 corresponding to the second wire-like transmission member 42 may be the same as each other regarding the thickness and the material of the outermost surface as with a wiring member 210 according to a second modification example illustrated in FIG. 8. For example, it is applicable that an outer diameter of the first wire-like transmission member 232 and an outer diameter of the second wire-like transmission member 242 are the same as each other, and the coverings 32*b* and 42*b* are formed of the same polyvinyl chloride (PVC) or polyethylene (PE).

The interval W1 between the first wire-like transmission members 232 in the first parallel section E1, the interval W2 between the second wire-like transmission members 242 in the second parallel section E2, and the interval Wm between the sections E1 and E2 may be set in the manner similar to the embodiment described above. In this case, the interval W1 and the interval W2 may be the same as each other. A maximum outer width W3 of the plurality of first wire-like transmission members 232 in the section E1 and a maximum outer width W4 of the plurality of wire-like transmission members 242 in the section E2 may be the same as each other. Sameness of the gap herein includes sameness within a range of a manufacturing error.

In this case, for example, the plurality or wire-like transmission members 232 and 242 can be separated into the plurality of first wire-like transmission members 232 and the plurality of second wire-like transmission members 242 and fused separately.

Figure 9:
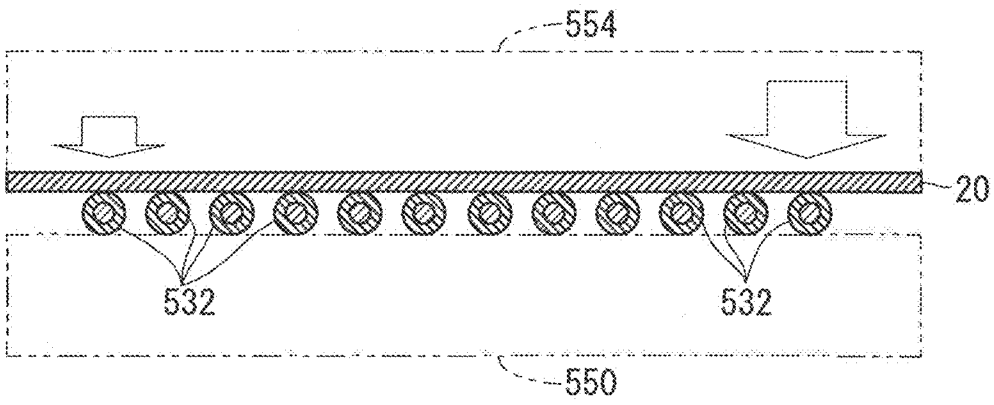
FIG. 9 is an explanation view illustrating an example of a fusion operation according to a comparative example.

That is to say, as illustrated in FIG. 9, a large number of wire-like transmission members 532 parallelly disposed and the base member 20 are disposed between a lower support tool 550 and an upper pressing tool 554 and fused. For example, the same type of six or more, eight or more, or ten or more electrical wires are parallelly disposed, for example. When the large number of wire-like transmission members 532 are pressed by the single upper pressing tool 554, a width of the upper pressing tool 554 gets large. When the upper pressing tool 554 has a slight inclination, a pressing position on right and left sides of the upper pressing tool 554 is considered to be significantly different in upper and lower sides. Thus, a fusion state is considered to be different on right and left sides of the large number of wire-like transmission members 532 in a parallel direction. When the number of wire-like transmission members 532 is large, assumed is a case where energy large enough to fuse all of the wire-like transmission members 532 cannot be applied.

Thus, as with the present second modification example, the interval Wm is provided between the first parallel section E1 and the second parallel section E2, and fusion of the first wire-like transmission member 232 in the first parallel section E1 and fusion of the second wire-like transmission member 242 in the second parallel section E2 are performed by different upper pressing tools using the interval Wm (refer to FIG. 7). Widths of the different pressing tools get small, thus a slight inclination of the pressing tool hardly has influence on the pressing position in the up-down direction. Energy appropriate for fusion is easily applied by the different pressing tools. Thus, the large number of wire-like transmission members 232 and 242 can be fused under conditions appropriate for each of the wire-like transmission member groups 30 and 40.

One of the first wire-like transmission member group 30 and the second wire-like transmission member group 40 preferably includes three or more wire-like transmission members, and both the first wire-like transmission member group 30 and the second wire-like transmission member group 40 may include three or more wire-like transmission members.

When the width W3 of the first wire-like transmission member 232 in the first parallel section E1 and the width W4 of the second wire-like transmission member 242 in the second parallel section E2 are the same as each other, the fusion operation of the first wire-like transmission member group 30 and the fusion operation of the second wire-like transmission member group 40 can be similar operations. For example, an operation can be performed on a premise that a width of an upper pressing tool performing fusion on the first wire-like transmission member group 30 and a width of an upper pressing tool for performing fusion on the second wire-like transmission member group 40 are the same operation. Accordingly, the fusion operation of the large number of wire-like transmission members 232 and 242 can be easily performed.

When the interval W1 between the plurality of first wire-like transmission members 232 in the first wire-like transmission member group 30 and the interval W2 between the plurality of second wire-like transmission members 242 in the second wire-like transmission member group 40 are the same as each other, an interval of fusion and the number of fusions can be easily equalized. Accordingly, fusion of the first wire-like transmission member group 30 and fusion of the second wire-like transmission member group 40 can be performed by similar operations. For example, application energy per unit time and a fusion time can be easily set to be the same. Each fusion operation can be set to be the same more easily in association with the configuration that the widths W3 and W4 are equalized.

Figure 10:
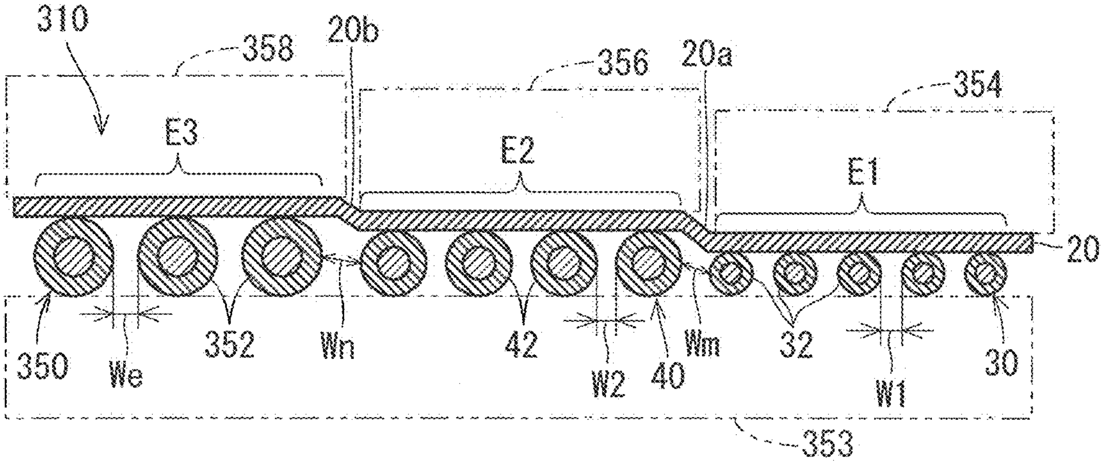
FIG. 10 is an explanation view illustrating an example of a fusion operation of fusing a wiring member according to a third modification example.

A wiring member may further include a third wire-like transmission member group 350 including a plurality of third wire-like transmission members 352 as with a wiring member 310 according to a third modification example illustrated in FIG. 10. The third wire-like transmission member group 350 includes a third parallel section E3 in which the plurality of third wire-like transmission members 352 are fused in a parallel state to the support surface 22 in a position adjacent to the second parallel section E2 on a side opposite to the first parallel section E1.

An interval Wn between the second parallel section E2 and the third parallel section E3 is set larger than the interval W2 between the second wire-like transmission members 42 in the second parallel section E2 and an interval We between the third wire-like transmission members 352 in the third parallel section E3.

In the present third modification example, the second wire-like transmission member 42 is thicker than the first wire-like transmission member 32, and the third wire-like transmission member 352 is thicker than the second wire-like transmission member 42.

According to the present disclosure, the interval Wn between the second parallel section E2 and the third parallel section E3 is larger than the intervals W2 and We described above. Thus, the appropriate fusion operation can be performed on each of the wire-like transmission member groups 30, 40, and 350 using the relatively large interval Wn between the second parallel section E2 and the third parallel section E3. For example, in the manner similar to the embodiment described above, the plurality of wire-like transmission members 32, 42, and 352 can be easily fused to the base member 20 using the lower support tool 353 and the upper pressing tools 354, 356, and 358.

For example, when the thicknesses of the plurality of wire-like transmission members 32, 42, and 352 are different from each other, inclination parts 20*a* and 20*b* for changing the height of the base member 20 in fusion can be provided using the intervals Wm and Wn.

Figure 11:
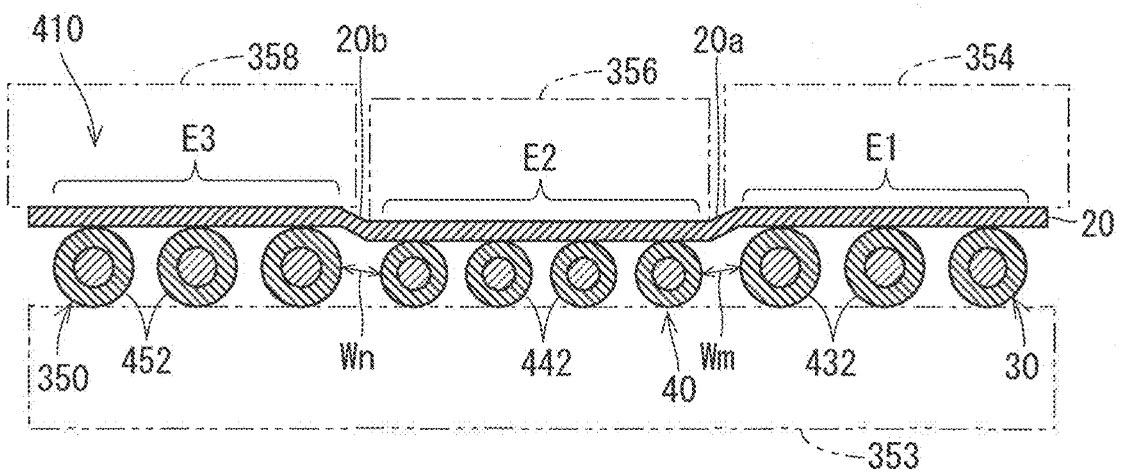
FIG. 11 is an explanation view illustrating an example of a fusion operation of fusing of fusing a wiring member according to a fourth modification example.

A first wire-like transmission member 432 corresponding to the first wire-like transmission member 32 and a third wire-like transmission member 452 corresponding to the third wire-like transmission member 352 may be thicker than a second wire-like transmission member 442 corresponding to the second wire-like transmission member 42 located between the first wire-like transmission member 432 and the third wire-like transmission member 452 as with a wiring member 410 according to a fourth modification example illustrated in FIG. 11.

Even in this case, the inclination parts 20*a* and 20*b* of the base member 20 caused by the thicknesses of the wire-like transmission members 432, 442, and 452 can be provided using the intervals Wm and Wn.

Each configuration described in the above embodiments and modification examples thereof can be appropriately combined as long as they are not contradictory.

EXPLANATION OF REFERENCE SIGNS

10, 110, 210, 310, 410 wiring member
20 base member
20*a*, 20*b* inclination part
22 support surface
28 contact surface
30 first wire-like transmission member group
32, 132, 232, 432 first wire-like transmission member
32*a*, 42*a* core wire
32*b*, 42*b* covering
40 second wire-like transmission member group
42, 142, 242, 442 second wire-like transmission member
50, 50B, 353, 550 lower support tool
54, 56, 154, 156, 354, 356, 358, 554 upper pressing tool
350 third wire-like transmission member group
352, 452 third wire-like transmission member
532 wire-like transmission member
E1 first parallel section
E2 second parallel section
E3 third parallel section
R overlap amount
W1, W2, Wm, We interval
W3 maximum outer width
W4 maximum outer width

The invention claimed is:

1. A wiring member, comprising:
a base member including a support surface;
a first wire-like transmission member group including a plurality of first wire-like transmission members; and
a second wire-like transmission member group including a plurality of second wire-like transmission members, wherein
the first wire-like transmission member group includes a first parallel section in which the plurality of first wire-like transmission members are fused in a parallel state to the support surface,
the second wire-like transmission member group includes a second parallel section in which the plurality of second wire-like transmission members are fused in a parallel state to the support surface in a position adjacent to the first parallel section,
an interval between the first parallel section and the second parallel section is larger than an interval between the first wire-like transmission members in the first parallel section and an interval between the second wire-like transmission members in the second parallel section,
a thickness of each of the first wire-like transmission members and a thickness of each of the second wire-like transmission members are different from each other, and
the first wire-like transmission members have a uniformed thickness and the second wire-like transmission members have a uniformed thickness that is different from the uniformed thickness of the first wire-like transmission members.

2. The wiring member according to claim 1, wherein
a material of an outermost surrounding surface of each of the first wire-like transmission members and a material of an outermost surrounding surface of each of the second wire-like transmission members are different from each other.

3. The wiring member according to claim 1, wherein
each of the first wire-like transmission members and each of the second wire-like transmission members are a same as each other regarding a material of an outermost surrounding surface.

4. The wiring member according to claim 3, wherein a width of the first wire-like transmission member group and a width of the second wire-like transmission member group are a same as each other.

5. The wiring member according to claim 3, wherein the interval between the plurality of first wire-like transmission members in the first wire-like transmission member group and the interval between the plurality of second wire-like transmission members in the second wire-like transmission member group are a same as each other.

6. The wiring member according to claim 1, wherein a contact mark of a fusion tool is formed between the first wire-like transmission member group and the second wire-like transmission member group in the base member.

7. The wiring member according to claim 1, further comprising a third wire-like transmission member group including a plurality of third wire-like transmission members, wherein the third wire-like transmission member group includes a third parallel section in which the plurality of third wire-like transmission members are fused in a parallel state to the support surface in a position adjacent to the second parallel section on a side opposite to the first parallel section, and an interval between the second parallel section and the third parallel section is larger than an interval between the second wire-like transmission members in the second parallel section and an interval between the third wire-like transmission members in the third parallel section.

8. The wiring member according to claim 7, wherein the thickness of each of the second wire-like transmission members is smaller than the thickness of each of the first wire-like transmission members, a thickness of each of the third wire-like transmission members is smaller the thickness of each of the second wire-like transmission members, and the third wire-like transmission members have a uniformed thickness that is smaller than the uniformed thickness of the second wire-like transmission members.

9. The wiring member according to claim 7, wherein a thickness of each of the third wire-like transmission members is equal to the thickness of each of the first wire-like transmission members, and the third wire-like transmission members have a uniformed thickness that is equal to the uniformed thickness of the first wire-like transmission members, and is different from the uniformed thickness of the second wire-like transmission members.

10. A method of manufacturing a wiring member for fusing a plurality of first wire-like transmission members in a first wire-like transmission member group and a plurality of second wire-like transmission members in a second wire-like transmission member group to a support surface of a base member, comprising:

fusing the plurality of first wire-like transmission members in a parallel state to the support surface in a first parallel section, fusing the plurality of second wire-like transmission members in a parallel state to the support surface in a second parallel section adjacent to the first parallel section, and making an interval between the first parallel section and the second parallel section larger than an interval between the first wire-like transmission members in the first parallel section and an interval between the second wire-like transmission members in the second parallel section, wherein a thickness of each of the first wire-like transmission members and a thickness of each of the second wire-like transmission members are different from each other, and the first wire-like transmission members have a uniformed thickness and the second wire-like transmission members have a uniformed thickness that is different from the uniformed thickness of the first wire-like transmission members.

11. The method of manufacturing the wiring member according to claim 10, wherein a process of fusing the plurality of second wire-like transmission members in a parallel state to the support surface is performed in the second parallel section separately from a process of fusing the plurality of first wire-like transmission members in a parallel state to the support surface in the first parallel section.

12. The method according to claim 11, wherein at least one of the application energy per unit or a fusion time is different between the process of fusing the plurality of first wire-like transmission members and the process of fusing the plurality of second wire-like transmission members.

13. The wiring member according to claim 1, wherein the thickness of each of the first wire-like transmission members is larger than the thickness of each of the second wire-like transmission members, and the number of the first wire-like transmission members in the first wire-like transmission member group is smaller than the number of the second wire-like transmission members in the second wire-like transmission member group.

14. The wiring member according to claim 1, wherein the number of the first wire-like transmission members in the first wire-like transmission member group is equal to the number of the second wire-like transmission members in the second wire-like transmission member group.

* * * * *